US006431306B1

United States Patent
Bishop et al.

(10) Patent No.: US 6,431,306 B1
(45) Date of Patent: Aug. 13, 2002

(54) POWER STEERING VALVE WITH VALVE SLEEVE RETAINER

(75) Inventors: Phillip A. Bishop, Kingsport; Otis Pierson, Church Hill, both of TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/772,140

(22) Filed: Jan. 29, 2001

(51) Int. Cl.[7] ................................. B62D 5/06
(52) U.S. Cl. ................ 180/421; 180/417; 180/441
(58) Field of Search ................. 180/421, 417, 180/441

(56) References Cited

U.S. PATENT DOCUMENTS

| 4,276,812 A | | 7/1981 | Dymond |
| 4,819,545 A | * | 4/1989 | Dymond ............... 180/423 |
| 4,877,100 A | * | 10/1989 | Emori et al. ............ 180/429 |
| 5,070,957 A | * | 12/1991 | Harkrader et al. ....... 180/429 |
| 5,092,418 A | * | 3/1992 | Suzuki et al. ........... 180/441 |
| 5,135,068 A | * | 8/1992 | Emori et al. ............ 180/421 |
| 5,293,954 A | | 3/1994 | Dymond |
| 5,511,630 A | * | 4/1996 | Kohata et al. ........... 180/421 |
| 6,035,957 A | | 3/2000 | Place |
| 6,216,813 B1 | * | 4/2001 | Sonoda et al. ........... 180/421 |

* cited by examiner

Primary Examiner—Daniel G. DePumpo
(74) Attorney, Agent, or Firm—Tarolli, Sundheim, Covell, Tummino & Szabo L.L.P.

(57) ABSTRACT

A fluid power assist rack and pinion steering system (12) for a vehicle having steerable wheels comprises a rack (66) connected with steering linkage of the vehicle for, upon movement of the rack, moving the steering linkage to effect turning of the steerable wheels. A rotatable pinion (64) is in meshing engagement with the rack (66). The steering system (12) also includes a control valve (22) comprising a valve core (40) rotatable relative to a valve sleeve (42). A first part (56) connects the valve sleeve (42) for rotation with the pinion (64). A mechanism (38) resists relative rotation between the valve core (40) and the valve sleeve (42) as vehicle speed increases by placing axial force on the valve sleeve. A second part (170) on the valve sleeve (42) resists axial movement of the valve sleeve relative to the valve core (40).

4 Claims, 2 Drawing Sheets

POWER STEERING VALVE WITH VALVE SLEEVE RETAINER

BACKGROUND OF THE INVENTION

1. Technical Field

The present invention relates to a vehicle power steering system, and more specifically to a hydraulic vehicle power steering system in which the resistance to actuation of a power steering control valve increases with increasing vehicle speed.

2. Description of Related Art

A vehicle power steering system including a rotary control valve is shown in U.S. Pat. No. 5,293,954. The valve has an inner valve member that is coaxial with and rotatable relative to an outer valve member or sleeve. To effect actuation of the power steering motor to turn steerable vehicle wheels, the inner valve member is rotated relative to the outer valve member. A fluid pressure reaction chamber is provided to regulate the torque required to rotate the inner valve member relative to the outer valve member. The fluid pressure in the reaction chamber increases as vehicle speed increases to increase the resistance felt by an operator of the vehicle to rotation of the inner valve member relative to the outer valve member.

The valve sleeve is assembled into the control valve by sliding it axially until a hitch pin, press fitted in a pinion, moves into an axially extending slot in the end of the valve sleeve. The engagement of the hitch pin in the slot couples the valve sleeve for rotation with the pinion in a follow-up manner.

Changes in the fluid pressure in the reaction chamber affect the forces acting on the valve sleeve. These forces can tend to urge the valve sleeve to move axially in its housing, relative to the hitch pin and the pinion. Upon such movement, seals that are disposed between the valve sleeve and the housing can be forced out of their grooves and into the annular space between the valve sleeve and the housing. This can adversely affect the seals.

SUMMARY OF THE INVENTION

The present invention is a fluid power assist rack and pinion steering system for a vehicle having steerable wheels. The steering system comprises a rack connected with steering linkage of the vehicle for, upon movement of the rack, moving the steering linkage to effect turning of the steerable wheels. A rotatable pinion is in meshing engagement with the rack. The steering system also includes a control valve comprising a valve core rotatable relative to a valve sleeve. A first part connects the valve sleeve for rotation with the pinion. A mechanism resists relative rotation between the valve core and the valve sleeve as vehicle speed increases by placing axial force on the valve sleeve. A second part on the valve sleeve resists axial movement of the valve sleeve relative to the valve core.

BRIEF DESCRIPTION OF THE DRAWINGS

The foregoing and other features of the present invention will become apparent to one skilled in the art upon reading the following description with reference to the accompanying drawings, in which.

DETAILED DESCRIPTION OF THE INVENTION

Figure 1:
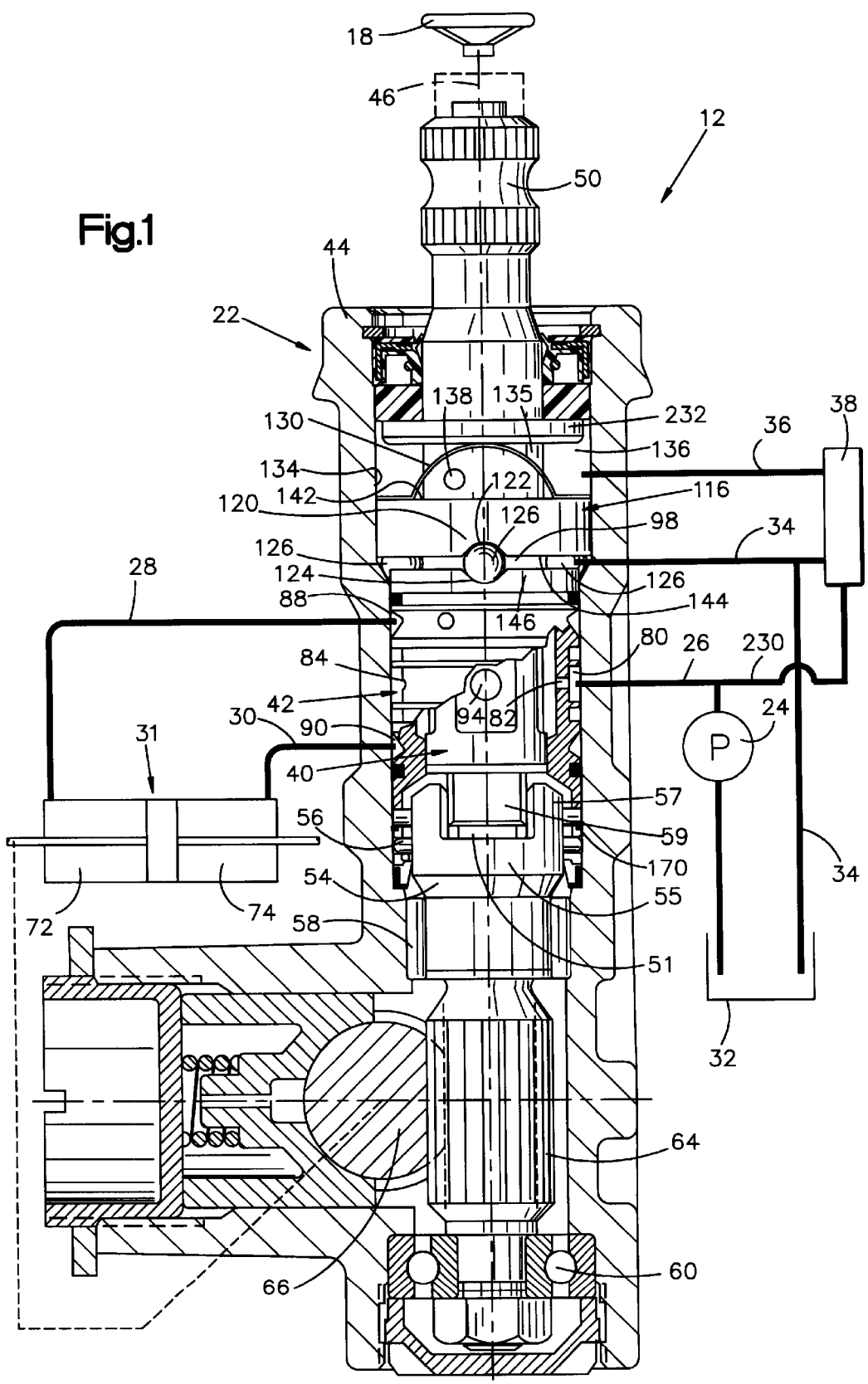
FIG. 1 is a schematic view of a portion of a vehicle fluid power assist rack and pinion steering system including a power steering control valve in accordance with the present invention.

The present invention relates to a vehicle power steering system, and more specifically to a hydraulic vehicle power steering system in which the resistance to actuation of a power steering control valve increases with increasing vehicle speed. As representative of the present invention, FIG. 1 illustrates a vehicle fluid power assist rack and pinion steering system 12.

The steering system 12 is of the type shown in U.S. Pat. No. 5,293,954 and is operable to turn steerable vehicle wheels (not shown) upon rotation of a steering wheel 18 by an operator of the vehicle. Rotation of the steering wheel 18 actuates a hydraulic power steering directional control valve 22 to port hydraulic fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels in one or another direction.

Simultaneously, fluid is conducted from the motor 31 to a reservoir 32 through the other one of the motor conduits 28 or 30, the control valve 22, return conduits 34 and 36, and a speed responsive control unit shown schematically at 38.

Thus, return conduit 36 conducts fluid from the steering valve 22 to the speed responsive control unit 38. Return conduit 34 conducts fluid from the steering valve 22 and the speed responsive control unit 38 to the reservoir 32. Conduit 230 conducts fluid from the pump 24 to the speed responsive control unit 38.

The control valve 22 includes an inner rotary valve member 40 and an outer rotary valve member or sleeve 42. The outer valve member 42 encloses the inner valve member 40. The inner valve member 40 and outer valve member 42 are rotatable relative to (a) each other and (b) a housing 44 about a common central axis 46.

The inner valve member 40 is formed on a part of a cylindrical input member or valve stem 50 that is connected with the steering wheel 18. The outer valve member 42 is connected with a follow-up member or pinion 54 by a diametrically opposed pair of hitch pins 56. The follow-up member 54 is rotatably supported in the housing 44 by bearings 58 and 60. The follow-up member 54 has a pinion gear portion 64 that is in meshing engagement with the toothed portion of a rack 66. The rack 66 is drivingly connected with the power steering motor 31 and steerable vehicle wheels as is well known in the art.

The inner valve member 40 and the outer valve member 42 are drivingly interconnected through a resilient torsion bar spring 51 (which is only partially visible in FIG. 1), as is well known in the art, and a drive mechanism 55 defined by dogs 57 on an end of the follow-up member 54 and tines 59 on an end of the input member 50. The dogs 57 and the tines 59 allow limited rotational movement of the input member 50 relative to the follow-up member 54 when torque in the pinion gear portion 64 required to displace the rack 66 exceeds the torque required to deflect the torsion bar 51. Hence, the input member 50 can be displaced by a few degrees relative to the follow-up member 54 with the displacement occurring in the torsion bar 51.

The outer valve member 42 is fixed against rotation relative to the follow-up member 54 by the hitch pins 56. Accordingly, the input member 50 and the inner valve member 40 can be rotated slightly with respect to the follow-up member 54 and the outer valve member 42. The amount of relative rotation, within the limits of the dog and tine drive mechanism 55, is proportional to the torque in the torsion bar 51 and other elements of the manual steering drive line, such as the follow-up member 54 and the input member 50. This relative rotation between the input member 50 and the outer valve member 42 is used to control the flow of hydraulic fluid from the pump 24 to the steering motor 31.

The pump 24 is a fixed positive displacement pump. The control valve 22 is of the open-center type. Therefore, when the control valve 22 is in an initial or unactuated neutral condition, that is when there is no steering demand, fluid flow from the pump 24 is directed by the control valve 22 to the return conduits 34 and 36 and reservoir 32. Hence, fluid is circulated at low pressure, by the pump 24 through the valve 22 and back to the reservoir 32.

Upon rotation of the steering wheel 18 and rotation of the valve stem 50, the inner valve member 40, if there is sufficient resistance to displacement of the rack 66 caused by frictional engagement of the vehicle tires with the ground or road surface, will be rotated about the axis 46 relative to the outer valve member 42. This relative rotation moves valving edges on the inner valve member 40 relative to valving edges on the sleeve 42, creates, in a known manner, a demand for higher pressure fluid from the pump 24 and directs the higher pressure fluid from the pump 24 to one of the motor conduits 28 or 30 and directs fluid from the other motor conduit to the reservoir 32.

As the power steering motor 31 operates, the rack 66, which is also the rod for the motor 31, rotates the pinion 64 and follow-up member 54. This rotation of the follow-up member 54 together with the torque from the torsion bar 51 rotates the outer valve member 42 relative to the inner valve member 40 tending to return the valve 22 to its open center, neutral position. When the motor 31 is operated to turn the steerable vehicle wheels to an extent corresponding to the extent of rotation of the inner valve member 40, the feedback of the rotation of the follow-up member 54 caused by movement of the rack 66 rotates the pinion 64 through a distance sufficient to move the outer valve member 42 to its initial position relative to the inner valve member. When this occurs, the fluid pressure in the motor cylinder chambers 72 and 74 falls and equalizes and the motor 31 stops operating.

Pressurized fluid from the pump 24 is conducted to an annular central groove 80 formed in the outer valve member 42. Fluid flows to the inside of the valve member 42 through a pair of diametrically opposite passages 82 and 84. The inner and outer valve members 40 and 42 may have the same construction and cooperate with each other and the torsion bar 51 in the same manner as described in U.S. Pat. No. 4,276,812 issued Jul. 7, 1981 and entitled "Power Steering Valve and Method of Making Same". However, the inner and outer valve members 40 and 42 could have a different construction if desired.

The control valve 22 may be a "four land" type valve. The inner valve member 40 has a generally square cross-sectional configuration with rounded corners that form the four valving lands that cooperate with the edges of four axially extending grooves formed inside the outer valve member 42 to control the flow of fluid to and from the motor 31. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

One end of the torsion bar 51 is connected to the valve stem 50 and the opposite end of the torsion bar is connected to the follow-up member 54. The torsion bar 51 resiliently deflects when subjected to torque in a vehicle steering activity enabling relative rotation between the inner and outer valve members 40 and 42, and when free of torque, urges the inner and outer valve members 40 and 42 to their initial positions all as is well known in the art.

The torque required to actuate the control valve 22 increases as vehicle speed increases. At relatively low vehicle speeds, relative rotation of the inner and outer valve members 40 and 42 is controlled by the spring constant of the torsion bar 51 and a relatively small torque is required to rotate the inner valve member 40 relative to the outer valve member 42 and hence actuate the hydraulic assist motor 31 making the steering feel less manual. At higher vehicle speeds, the control unit 38 causes fluid pressure to act on a slidable, annular force transmitting member 116. The member 116 is drivingly connected to the input member 50, a cam assembly 120, and outer valve member 42 that cooperates with the torsion bar 51 to require a larger torque to rotate the inner valve member 40 relative to the outer valve member 42 making the steering feel more manual.

The force transmitting member or slider 116 is disposed in the power steering control valve housing 44. The force transmitting member 116 rotates about its central axis 46 with the inner valve member 40 and the valve stem 50 and is movable axially along the valve stem 50.

The force transmitting member 116 is connected with the outer valve member 42 by the cam assembly 120. The cam assembly 120 includes a plurality of downwardly facing cam surfaces 122 on the force transmitting member 116, a plurality of upwardly facing cam surfaces 124 on the outer valve member 42, and a plurality of balls or spherical cam elements 126 located between the cam surfaces 122 and 124, preferably four of each. However, a greater or lesser number of cam elements 126 and cam surfaces 122 and 124 could be used if desired.

The force transmitting member 116 is urged axially toward the outer valve member 42 by a spring 130 acting between a collar 232 connected to the valve stem 50 and the slidable force transmitting member 116. The force applied against the force transmitting member 116 by the spring 130 urges the cam surfaces 122 and 124 against opposite sides of the balls 126 and maintains and centers the balls on the cam surfaces 122 and 124.

Annular upper surface 142 and annular lower surface 144 of the force transmitting member 116 cooperate with a cylindrical inner side surface 134 of the housing 44 and the cylindrical outer surface 135 of the valve stem 50 to partially define a chamber 98 and an annular pressure chamber 136 on axially opposite sides of the force transmitting member 116. A pair of diametrically opposite openings 94 in the inner valve member 40 extend radially inward to an axially extending central passage in the inner valve member 40 in which (a) the torsion bar 51 is located and (b) is used to conduct hydraulic fluid to the chamber 136 through opening 138 extending radially outwardly from the axially extending central passage.

The pressure chamber 136 is connected to the reservoir 32 by the return conduits 36 and 34 and the speed responsive control unit 38. From the pressure chamber 136 the fluid is conducted to the speed responsive control unit 38 by the return conduit 36 and from the speed responsive control unit 38 to the reservoir 32 by the return conduit 34.

The force transmitting member 116 has a generally fluid tight fit with the inner side surface 134 of the housing 44. The chamber 98 is connected in fluid communication with the reservoir 32 by return conduit 34. Any fluid that leaks from the pressure chamber 136 into the chamber 98 is thus conducted back to the reservoir 32.

Although the preferred embodiment of the present invention is shown with the spring 130 located in chamber 136, the spring 130 might not be used. If there is no spring, the length of the steering control valve housing 44 can be reduced by reducing the axial length of the chamber 136.

Rotation of the valve stem 50 and inner valve member 40 relative to the housing 44 and outer valve member 42 is resisted by a force that is related to the spring constant of the torsion bar 51 and a combination of the axial force on the force transmitting member 116 by spring 130 and the fluid pressure force applied against the annular surface 142.

The balls 126 act as driving connections between the force transmitting member 116 and the outer valve member 42. Upon rotation of the inner valve member 40, the cam surfaces 122 and 124 in the force transmitting member 116 and outer valve member 42 create axial and tangential forces on the balls 126 with respect to the force transmitting member 116 and the outer valve member 42. These forces translate into (a) additional torque in the steering column felt by the operator of the vehicle, and (b) resistance to relative rotation of the inner and outer valve members 40 and 42.

Relative rotation between the inner valve member 40 and the outer valve member 42 causes the spherical elements 126 to tend to roll on the cam surfaces 122 and 124 and therefore to move the force transmitting member 116 axially away from an end 146 of the outer valve member 42. Obviously, the force required to move the force transmitting member 116 axially away from the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 and inner valve member 40 relative to the outer valve member 42.

The speed responsive control unit 38 responds to steering activity and vehicle speed to control the fluid pressure in the chamber 136. The speed responsive control unit 38 is connected in fluid communication with the chamber 136 in the housing 44 by the return conduit 36.

At engine idle and relatively low vehicle speeds, a relatively low fluid pressure is present in the return conduit 36 and in the chamber 136. At engine idle and low vehicle speeds, the force of the spring 130 and the low fluid pressure in chamber 136 urge the force transmitting member 116 toward the cam elements 126. Thus, there is little resistance to relative rotation between the valve stem 50 and outer valve member 42 and the steering effort feels less manual.

At relatively high speeds of the vehicle, the pressure in chamber 136 is at a maximum and there is maximum resistance to relative rotation of the valve stem 50 and outer valve member 42 and less hydraulic assist is provided and the steering feels more manual.

Changes in the fluid pressure in the chamber 136 affect the axial forces acting on the valve sleeve 42. When the pressure in the chamber 136 is relatively low, fluid pressure in the control valve 22 can tend to urge the valve sleeve 42 to mbve axially in its housing 44, in an upward direction as viewed in the drawings. Upon such movement, seals 160, such as the one shown in FIG. 2, that seal the annular space between the valve sleeve 42 and the housing 44, can be forced out of their grooves and into the annular space between the valve sleeve and the housing. This can adversely affect the sealing ability of the seals 160.

Figure 2:
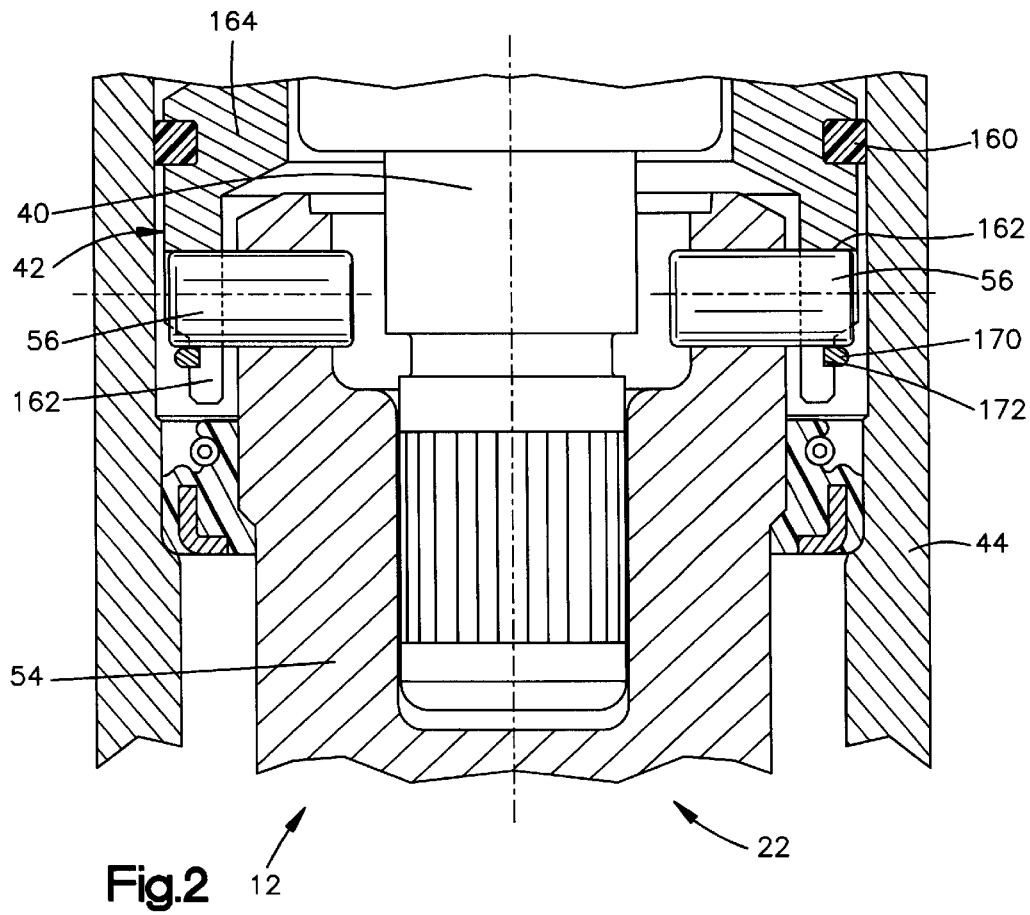
FIG. 2 is an enlarged sectional view of a portion of the steering system of FIG. 1.
Figure 3:
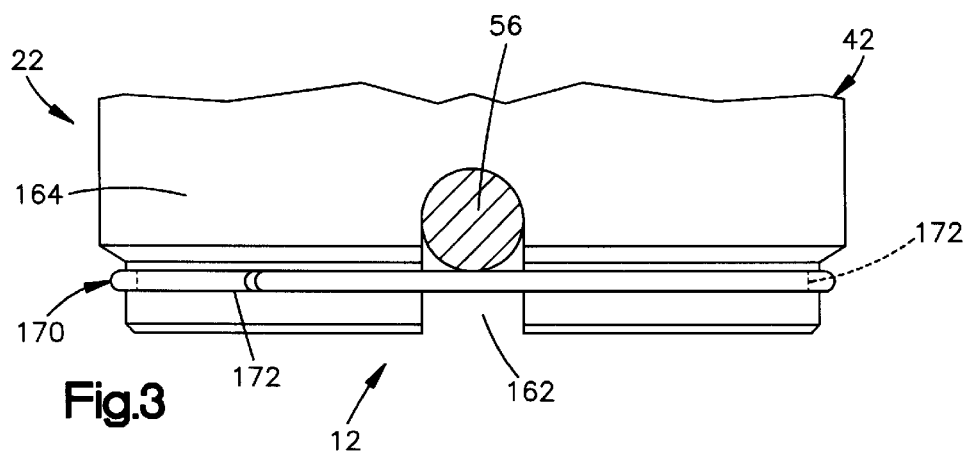
FIG. 3 is a further enlarged view of a portion of the steering system of FIG. 1.

In accordance with the present invention, the axial movement of the valve sleeve 42 is limited by a snap ring 170 placed on the valve sleeve 42 after the valve sleeve is assembled with the hitch pins 56. The valve sleeve 42 (FIGS. 2 and 3) is initially assembled into the control valve 22 by sliding it axially until the hitch pins 56, which are press fitted in the pinion 54, move into axially extending slots 162 in a lower end portion 164 of the valve sleeve 42. FIGS. 2 and 3 show one of the pin/slot assemblies. The engagement of the hitch pins 56 in the slots 162 couples the valve sleeve 42 for rotation with the pinion 54 in a follow-up manner. In this initial condition of assembly, however, the valve sleeve 42 is movable axially off the hitch pins 56, that is, in an upward direction as viewed in FIGS. 2 and 3, in response to the axial forces in the control valve 22.

The snap ring 170 is received in a groove 172 in the valve sleeve 42. The groove 172 extends 360 degrees around the outer circumference of the valve sleeve 42, in the lower end portion 164 of the valve sleeve. The groove 172 extends through, and is thus discontinuous at, the two slots 162. The groove 172 is located so that the snap ring 170 engages the two hitch pins 56 when the snap ring is placed in the groove.

During operation of the steering system 12, forces that tend to move the valve sleeve 42 in a downward direction as viewed in FIGS. 2 and 3 are counteracted by the engagement of the hitch pins 56 with the closed ends of the slots 162. Forces that tend to move the valve sleeve 42 in an upward direction as viewed in FIGS. 2 and 3 are counteracted by the engagement of the snap ring 170 with the hitch pins 56. The snap ring 170 engages the hitch pins 56 to limit axial movement of the valve sleeve 42 in this direction, relative to the pinion 56 and the valve core 40. This prevents the seals 160 from being extruded into the gap between the valve sleeve 42 and the housing 44.

From the above description of the invention, those skilled in the art will perceive improvements, changes and modifications in the invention. Such improvements, changes and modifications within the skill of the art are intended to be covered by the appended claims.

We claim:

1. A fluid power assist rack and pinion steering system for a vehicle having steerable wheels, comprising:

a rack connected with steering linkage of the vehicle for, upon movement of said rack, moving the steering linkage to effect turning of the steerable wheels;

a rotatable pinion in meshing engagement with said rack;

a control valve comprising a valve core rotatable relative to a valve sleeve;

a first part connecting said valve sleeve for rotation with said pinion, said first part being received in a slot in said valve sleeve;

a mechanism for resisting relative rotation between said valve core and said valve sleeve as vehicle speed increases by placing axial force on said valve sleeve; and a second part on said valve sleeve for resisting axial movement of said valve sleeve relatives to said valve core, said second part comprising a snap ring received in a groove in said valve sleeve, said groove extending across said slot, said snap ring being engageable with said first part to limit axial movement of said valve sleeve.

2. A fluid power assist rack and pinion steering system for a vehicle having steerable wheels, comprising:

a rack connected with steering linkage of the vehicle for, upon movement of said rack, moving the steering linkage to effect turning of the steerable wheels;

a rotatable pinion in meshing engagement with said rack;

a control valve comprising a valve core rotatable relative to a valve sleeve;

a first part connecting said valve sleeve for rotation with said pinion;

a mechanism for resisting relative rotation between said valve core and said valve sleeve as vehicle speed increases by placing axial force on said valve sleeve; and a second part on said valve sleeve for resisting axial movement of said valve sleeve relative to said valve core, said first part being a pin fixed for movement with said pinion and received in a slot in said valve sleeve, said second part extending across said slot to resist movement of said pin in said slot and thereby resist axial movement of said valve sleeve relative to said valve core.

3. A steering system as set forth in claim 2 wherein said second part comprises a ring.

4. A steering system as set forth in claim 3 wherein said ring comprises a snap ring received in a groove in said valve sleeve.

* * * * *